United States Patent
Wang et al.

(10) Patent No.: US 10,399,662 B2
(45) Date of Patent: Sep. 3, 2019

(54) AIRCRAFT WITH CABIN ACOUSTIC SYSTEMS HAVING QUARTER WAVELENGTH ABSORBERS

(71) Applicant: Gulfstream Aerospace Corporation, Savannah, GA (US)

(72) Inventors: Tongan Wang, Savannah, GA (US); Michael Brinley, Savannah, GA (US); Paul Conti, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 109 days.

(21) Appl. No.: 15/251,718

(22) Filed: Aug. 30, 2016

(65) Prior Publication Data

US 2018/0057138 A1 Mar. 1, 2018

(51) Int. Cl.
*B64C 1/40* (2006.01)
*G10K 11/172* (2006.01)

(52) U.S. Cl.
CPC ............. *B64C 1/40* (2013.01); *G10K 11/172* (2013.01)

(58) Field of Classification Search
CPC ......... B64C 1/40; B61D 17/185; B60R 13/08; B62D 33/0604; G10K 11/172
USPC .......................................... 244/1 N; 181/206
See application file for complete search history.

(56) References Cited

U.S. PATENT DOCUMENTS

| | | | | |
|---|---|---|---|---|
| 3,612,446 A | * | 10/1971 | Lebert | B64C 21/02 244/1 N |
| 4,362,223 A | * | 12/1982 | Meier | F16L 55/02763 181/206 |
| 4,667,768 A | * | 5/1987 | Wirt | G10K 11/172 181/286 |
| 4,715,559 A | * | 12/1987 | Fuller | G10K 11/178 244/1 N |
| 6,260,660 B1 | * | 7/2001 | Yoerkie, Jr. | B64C 1/40 181/286 |
| 7,837,008 B1 | * | 11/2010 | Lane | B64G 1/22 181/198 |
| 7,970,148 B1 | * | 6/2011 | Remington | G10K 11/178 181/206 |
| 2009/0166127 A1 | * | 7/2009 | Thomas | B64C 1/40 181/292 |
| 2009/0173572 A1 | * | 7/2009 | Grenzing | G10K 11/172 181/292 |
| 2010/0148001 A1 | * | 6/2010 | Hoetzeldt | B32B 3/08 244/1 N |
| 2010/0252677 A1 | * | 10/2010 | Petitjean | B64C 1/40 244/1 N |
| 2011/0186380 A1 | * | 8/2011 | Beauvilain | B60R 13/08 181/292 |

(Continued)

FOREIGN PATENT DOCUMENTS

RU 2512134 C2 * 4/2014

*Primary Examiner* — Richard R. Green
*Assistant Examiner* — Brady W Frazier
(74) *Attorney, Agent, or Firm* — LKGlobal | Lorenz & Kopf, LLP

(57) ABSTRACT

An aircraft includes a fuselage, a cabin surface, and a first chamber. The cabin surface is disposed within the fuselage and defines a first aperture and at least part of a cabin air mass having a first acoustic mode. The first chamber is acoustically coupled with the aperture and has a length that is one quarter of a wavelength of sound at the first acoustic mode.

20 Claims, 3 Drawing Sheets

(56) References Cited

U.S. PATENT DOCUMENTS

| | | | | |
|---|---|---|---|---|
| 2011/0248117 A1* | 10/2011 | Boock | ............... | B32B 3/12 |
| | | | | 244/1 N |
| 2012/0068012 A1* | 3/2012 | Dolzinski | ............... | B64C 1/067 |
| | | | | 244/1 N |
| 2012/0256048 A1* | 10/2012 | Wang | ............... | B64C 1/406 |
| | | | | 244/1 N |
| 2012/0267475 A1* | 10/2012 | Campos | ............... | B64C 1/1461 |
| | | | | 244/1 N |
| 2013/0264147 A1* | 10/2013 | Sugimoto | ............... | B61D 17/185 |
| | | | | 181/292 |
| 2013/0299630 A1* | 11/2013 | Redecker | ............... | B64C 1/067 |
| | | | | 244/1 N |
| 2015/0047923 A1* | 2/2015 | Chang | ............... | G10K 11/172 |
| | | | | 181/286 |
| 2015/0144422 A1* | 5/2015 | Caillet | ............... | B64C 1/40 |
| | | | | 181/292 |
| 2015/0144734 A1* | 5/2015 | Savian | ............... | B64C 1/066 |
| | | | | 244/1 N |
| 2015/0274278 A1* | 10/2015 | Lucas | ............... | B64C 1/40 |
| | | | | 244/1 N |
| 2016/0171960 A1* | 6/2016 | Porte | ............... | C23C 4/134 |
| | | | | 181/292 |

* cited by examiner

US 10,399,662 B2

AIRCRAFT WITH CABIN ACOUSTIC SYSTEMS HAVING QUARTER WAVELENGTH ABSORBERS

TECHNICAL FIELD

The present invention generally relates to aircraft with acoustic systems to attenuate low frequency noise, and more particularly relates to aircraft acoustic systems that are disposed inside a fuselage of the aircraft and are tuned to abate noise at low frequencies using quarter wavelength absorbers.

BACKGROUND

Conventional aircraft often produce loud, irritating, or otherwise unwanted noises in the passenger compartment of the aircraft. Acoustic treatments are typically used to reduce the noise in the passenger compartment. Such conventional acoustic treatments are typically effective for attenuating high frequency noises and ineffective for attenuating low frequency noises, such as engine tonal noise created by residual fan imbalance at shaft rotational frequencies.

Accordingly, it is desirable to provide an improved acoustic system for attenuating low frequency noises within an aircraft passenger cabin. Furthermore, other desirable features and characteristics will become apparent from the subsequent summary and detailed description and the appended claims, taken in conjunction with the accompanying drawings and the foregoing technical field and background.

BRIEF SUMMARY

Aircraft with improved acoustic systems for attenuating low frequency noises are disclosed herein.

In a first non-limiting embodiment, an aircraft includes, but is not limited to, a fuselage. The aircraft further includes, but is not limited to, a cabin surface within the fuselage. The cabin surface defines a first aperture and at least part of a cabin air mass having a first acoustic mode. The aircraft still further includes, but is not limited to, a first chamber acoustically coupled with the first aperture and having a length that is one quarter of a wavelength of sound at the first acoustic mode.

In a second non-limiting embodiment, an aircraft includes, but is not limited to, a fuselage enclosing a passenger compartment. The aircraft further includes, but is not limited to an engine attached to the fuselage and configured to generate a noise at a first frequency. The aircraft further includes a cabin surface within the fuselage that defines a first aperture acoustically coupled with the passenger compartment. The aircraft still further includes a first chamber acoustically coupled with the first aperture and having a length that is one quarter of a wavelength of sound at the first frequency.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

An improved acoustic system for aircraft is disclosed herein. The acoustic system utilizes one quarter wavelength absorbers, where a chamber or acoustic cavity length is designed or tuned to be one quarter of the wavelength of the tonal noise to be attenuated. As a result, the reflected sound wave from the end of the chamber or acoustic cavity effectively cancels the sound field in the cabin, resulting in significant cabin noise reduction. In some embodiments, the systems are tuned to attenuate tonal frequencies associated with engines on the aircraft. In some embodiments, the system is a coupled system where the chambers are tuned to change the boundary conditions and modal behavior of the air mass within the aircraft. For example, such a coupled system may tune the chambers to the same frequency as the acoustic mode in the unmodified cabin so that the acoustic mode of the combined system will shift to different frequencies.

In some embodiments, the openings to the chambers are hidden from the view of passengers by closeout panels and other finishing components in the cabin. The openings or apertures may be large apertures of more than 1 inch diameter or may be small perforations in the cabin surface, as long as the aperture acoustically couples the cabin with the chamber at the frequency to be attenuated. In some embodiments, chambers with different lengths are included to attenuate tonal noise at multiple frequencies.

A greater understanding of the acoustic systems described above may be obtained through a review of the illustrations accompanying this application together with a review of the detailed description that follows.

Figure 1:
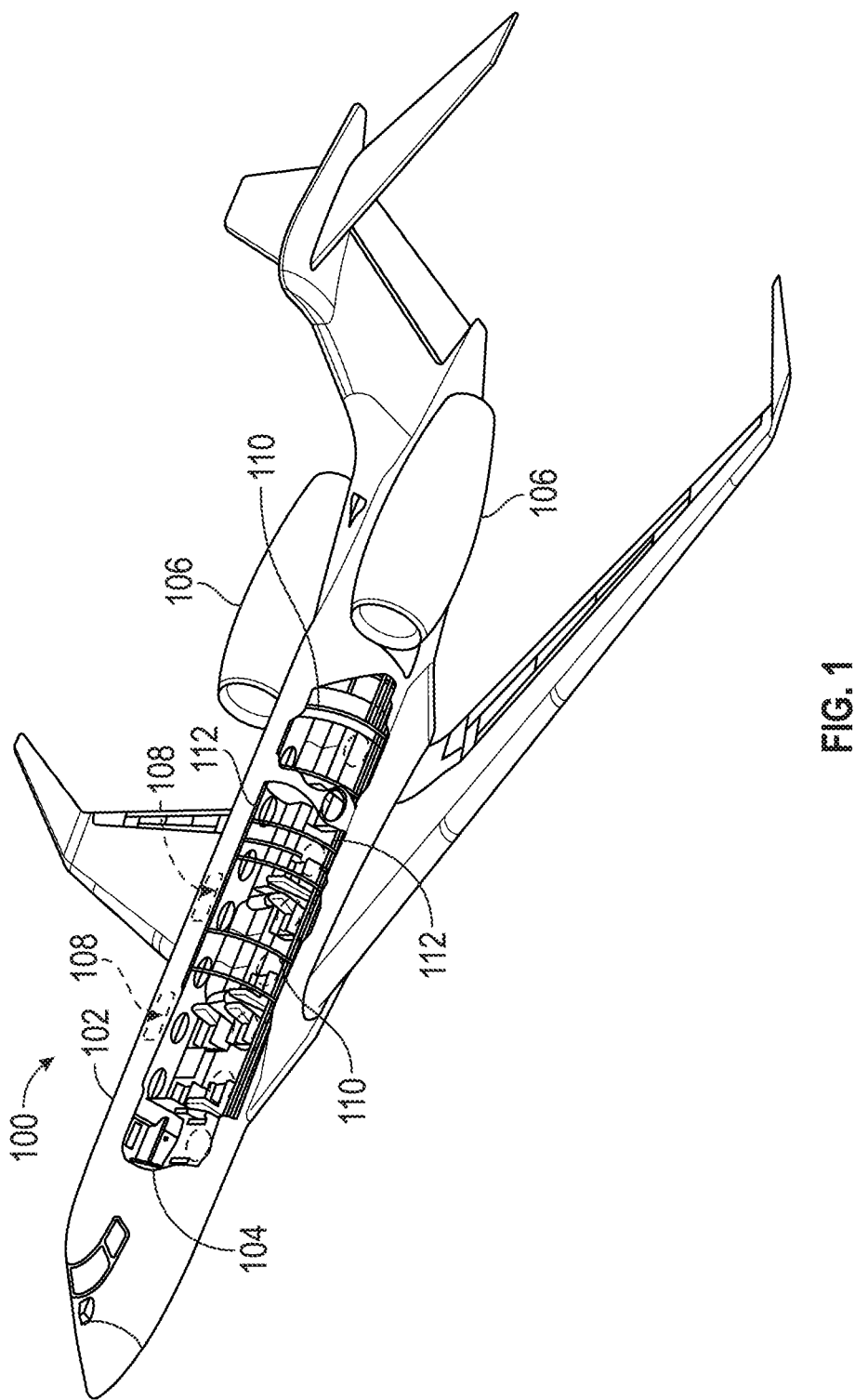
FIG. 1 is a perspective cut-away view illustrating an aircraft equipped with a non-limiting embodiment of an acoustic system in accordance with principles of the present disclosure.

FIG. 1 is a perspective view of an aircraft 100. Aircraft 100 includes a fuselage 102, a passenger compartment 104, engines 106, and acoustic systems 108. In the example provided, aircraft 100 is a jet airplane. It should be appreciated that the principles described herein may be utilized in other aircraft, land vehicles, water vehicles, space vehicles, or other machinery without departing from the scope of the present disclosure. For example, similar acoustic systems may be implemented in submarines, helicopters, airships, spacecraft, automobiles, or other machinery with an enclosed volume of air.

Figure 2:
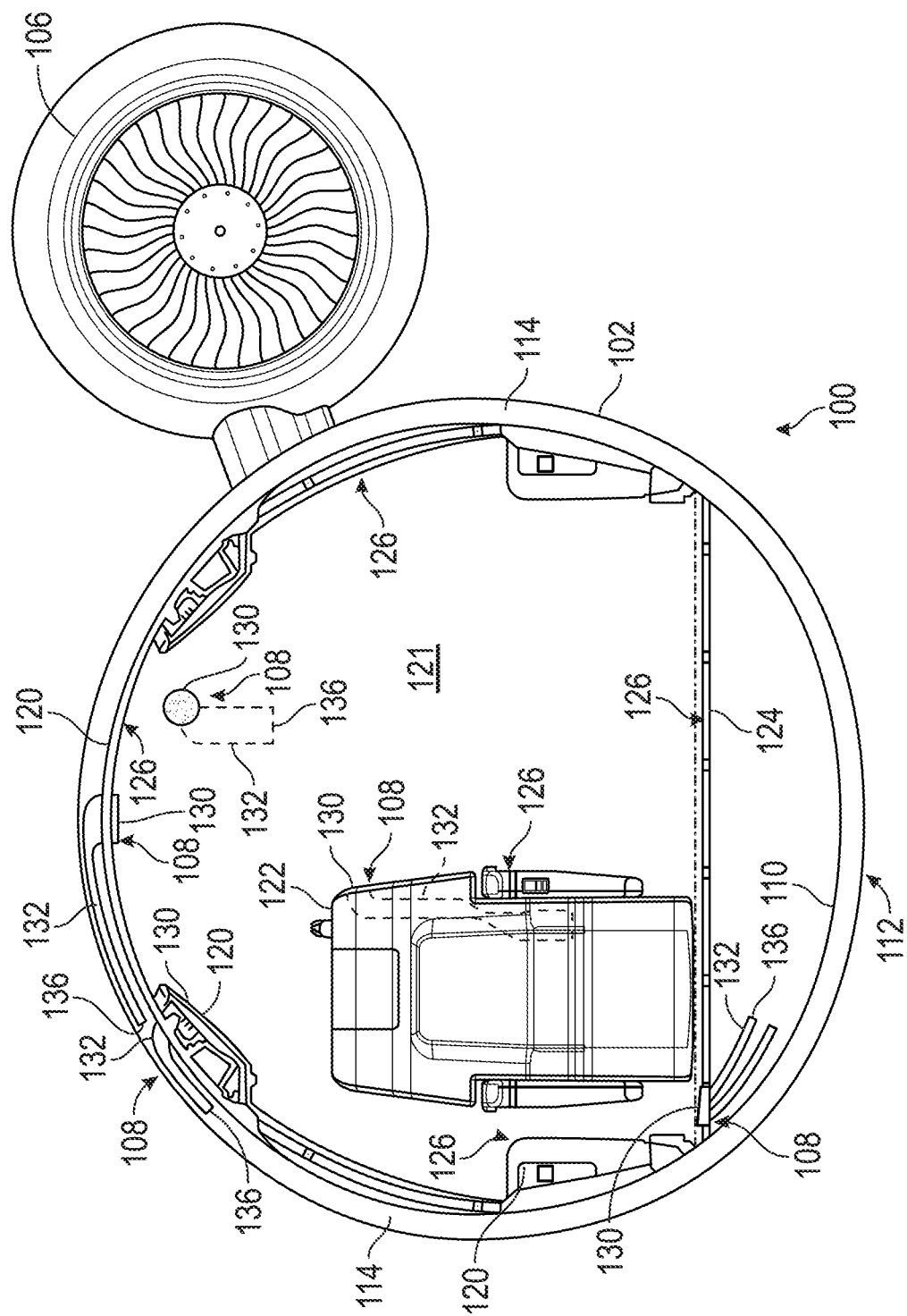
FIG. 2 is a cutaway view of the aircraft of FIG. 1 in accordance with principles of the present disclosure.

With continuing reference to FIG. 1, FIG. 2 is a cross-section view of aircraft 100. Fuselage 102 encloses passenger compartment 104 and includes a fuselage frame 110 and a fuselage skin 112. Fuselage skin 112 forms the periphery of aircraft 100 and encloses interior passenger compartment 104. During flight, the fuselage is excited by a turbulent boundary layer ("TBL") and loading from engines 106 producing noise in the cabin.

Adjacent fuselage frames 110 form frame bay cavities in which electronics, communication cables, oxygen hoses, thermal/acoustic insulation pieces, or other aircraft systems may be located. Thermal/acoustic insulation pieces may be fiberglass insulation or other acoustic treatment materials that reduce the TBL and engine noises transmitted into the cabin. Acoustic treatment made of foam blocks or other sound absorptive materials in the cabin provide sound absorption at high frequencies, but absorb very little sound at low frequencies (e.g., at about 100 Hz).

In the example provided, passenger compartment 104 is a cabin of aircraft 100. It should be appreciated that other passenger compartments, such as flight decks or other occupied spaces within fuselage 102 may be utilized without departing from the scope of the present disclosure. Passenger compartment 104 includes closeout panels 120, a bulkhead 121, furniture 122, and a floor 124. Passenger compartment 104 defines acoustically absorptive cabin surfaces 126. For example, the inner surfaces of closeout panels 120, various surfaces of furniture 122, and the upper surface of floor 124 may define cabin surfaces 126 with foam, leather, fabric, composites, or other acoustically absorptive materials. Those of ordinary skill in the art are well aware of how to determine which materials are acoustically absorptive, and therefore further discussion of acoustic absorption will be omitted.

The size and shape of passenger compartment 104 along with the positions of cabin surfaces 126 at least partially define an air mass having various acoustic modes. Acoustic modes describe the acoustic response of the air mass to excitation of the air mass, and may also be described with terms such as modal resonances, standing wave, resonance frequencies, or the like, as will be appreciated by those with ordinary skill in the art. In general, the acoustic modes describe sound frequencies that may appear to be more pronounced or louder to passengers in passenger compartment 104. Engines 106 generate engine loadings that excite the cabin air mass at various acoustic modes, which may be an annoyance to passengers within passenger compartment 104.

A first acoustic mode of the air mass is associated with a frequency that is not affected efficiently by sound absorptive treatments. For example, low frequency (e.g., below 500 Hz) noises are not affected efficiently by conventional sound absorptive treatments. In the example provided, the air mass has a first acoustic mode at about 100 Hz and a second acoustic mode at about 200 Hz. It should be appreciated that the air mass may have additional acoustic modes at frequencies that are above 200 Hz, are below 100 Hz, or are between 100 Hz and 200 Hz without departing from the scope of the present disclosure. In some embodiments, the first acoustic mode is between about 50 Hz and about 150 Hz. In some embodiments, the first acoustic mode is between about 90 Hz and about 110 Hz. In some embodiments, the first acoustic mode is at about 100 Hz. As discussed above, the acoustic modes are heavily influenced by the particular implementation.

Acoustic systems 108 are tuned resonant sound absorbers that are tuned to absorb the low frequency (e.g., below 500 Hz) sounds in passenger compartment 104. Acoustic systems 108 include apertures 130 and chambers 132. Apertures 130 are acoustically coupled with passenger compartment 104 so that sound waves can travel between chambers 132, apertures 130, and passenger compartment 104. In some embodiments, apertures 130 may be covered with acoustic treatments, such as soft finishing materials or traditional sound absorbers. It should be appreciated that the size and shape of apertures 130 may vary in any particular implementation without departing from the scope of the present disclosure. In some embodiments, apertures 130 are round with diameters of several inches. In some embodiments, such as illustrated on bulkhead 121, apertures 130 are micro perforations with round diameters less than 1 mm. In some embodiments, apertures have rectangular, trapezoidal, ovular, or other shapes with various sizes. In the example provided, some apertures 130 are defined by cabin surfaces 126. For example, closeout panels 120 or floor 124 may define apertures through a depth of the respective closeout panel 120 or floor 124.

Apertures 130 are distributed over an area of passenger compartment 104 where noise is to be abated. In some embodiments, apertures 130 are distributed along longitudinal and lateral directions of fuselage 102. For example, a first aperture 130 in the ceiling of passenger compartment 104 and a second aperture 130 on bulkhead 121 are distributed along a length of fuselage 102. In some embodiments, apertures 130 define an elongated opening. In some embodiments, fabric or other materials cover apertures 130 for aesthetics.

Chambers 132 are acoustically coupled with apertures 130 and have lengths that are about one quarter of the wavelength of the sound to be abated within passenger compartment 104. The length of each of chambers 132 is measured as the total travel length of sound passing from apertures 130 to an end portion 136 of each chamber 132. For example, chambers 132 may bend, twist, curve, or otherwise change shape along a length of the respective chamber 132 as long as the sound waves propagating through chamber 132 reach end portion 136 before reflecting back towards aperture 130. At one quarter of the wavelength, the reflected sound cancels out the noise at aperture 130 with substantially equal force amplitude and opposite phase for passive noise cancelation. In some embodiments, chambers 132 are formed from acoustically reflective materials along substantially an entire length of chambers 132 to contain sound waves traveling within each chamber 132.

In some embodiments, a single chamber 132 is dedicated to a single aperture 130. In other embodiments, such as illustrated by acoustic system 108 in floor 124, multiple chambers 132 are associated with a single aperture 130. In some embodiments, such as illustrated by acoustic systems 108 in ceiling closeout panel 120 and bulkhead 121, multiple apertures 130 are associated with a single chamber 132. Chambers 132 may be disposed behind closeout panels 120, within furniture 122, below floor 124, between frames 110, or in any other suitable location without departing from the scope of the present disclosure. In some embodiments, chambers 132 have lengths of about two and a half feet to correspond with the first acoustic mode of the air mass in passenger compartment.

As discussed above, acoustic systems 108 are tuned to a frequency that is to be abated. In some embodiments, the frequency corresponds to a low frequency (e.g., below 500 Hz) sound generated by engines 106. For example, engines 106 may be configured to generate a noise at a first frequency of about 100 Hz. Low frequency tonal noises in turboprop engines, for example, may be caused by blade passage within engines 106. Where variable speed engines 106 are installed, a progression of apertures 130 having chambers 132 of different lengths may be utilized to abate a range of frequencies. For example, chambers 132 may have lengths corresponding to frequencies of 85 Hz, 95 Hz, and 105 Hz to abate noises from engines 106 at different speeds.

In some embodiments, acoustic systems 108 are tuned to the acoustic modes of the air mass within passenger compartment 104 as they exist in the absence of acoustic systems 108. Tuning to the acoustic modes of the air mass effectively changes the acoustic modes of the air mass. For example, by tuning to a first acoustic mode of the air mass, acoustic systems 108 change the boundary conditions of passenger compartment 104 to shift modes and decouple acoustic modes from excitation inputs. Excitation tones of engines 106, acoustic system 108 characteristics, and the air mass acoustics form a coupled system.

In some embodiments, a first chamber 132 has a length that is one quarter of a wavelength of sound at a first frequency of a first acoustic mode of the air mass and a second chamber 132 has a length that is one quarter of a wavelength of sound at a second frequency of a second acoustic mode of the air mass.

Figure 3:
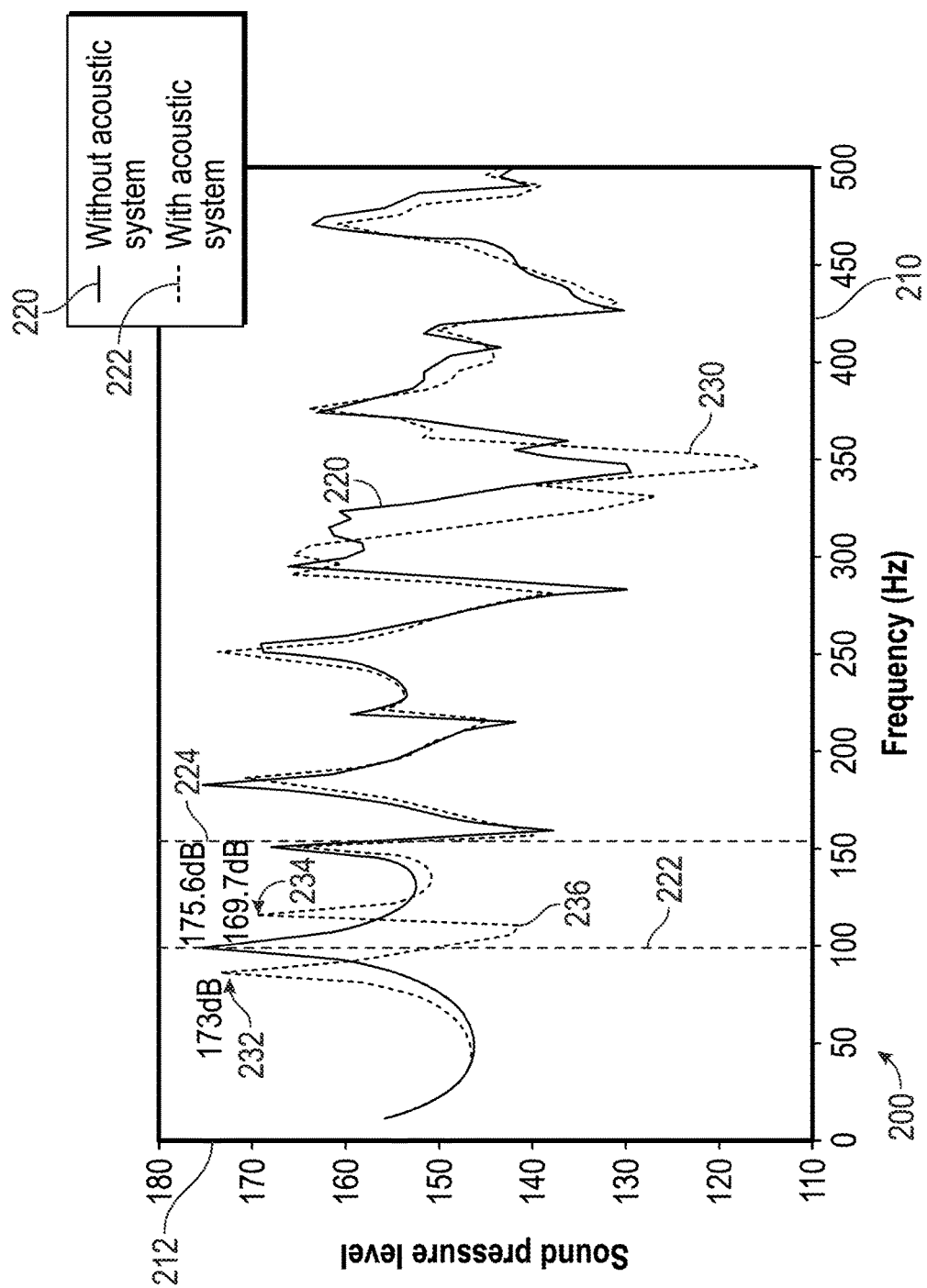
FIG. 3 is a graphical view of an acoustic response of an air mass within the aircraft of FIG. 1, in accordance with principles of the present disclosure.

Referring now to FIG. 3, a graph 200 illustrates the acoustic response of excitations of an exemplary air mass, such as passenger compartment 104. It should be appreciated that the values depicted in FIG. 3 are merely examples, and that the values may vary based on the particular implementation. Graph 200 illustrates a sound pressure response 212 at different frequencies 210 of excitation with a constant amplitude excitation input, as will be appreciated by those with ordinary skill in the art. A first curve 220 shows the acoustic response in the passenger compartment 104 in the absence of acoustic system 108. In other words, first curve 220 illustrates the acoustic response of a conventional aircraft cabin. First curve 220 shows that the air mass has a first acoustic mode 222 at about 100 Hz, has a second acoustic mode 224 at about 150 Hz, and has other acoustic modes at higher frequencies.

A second curve 230 illustrates the acoustic response of the passenger compartment 104 with acoustic system 108 when chamber 132 is tuned to the first acoustic mode at about 100 Hz. As can be seen at peaks 232, 234 and trough 236, acoustic system 108 has changed the boundary conditions of the air mass and has substantially eliminated first acoustic mode 222. Instead, two modes at peaks 232 and 234 have sound pressure levels that are less than the sound pressure level at first acoustic mode 222 of first curve 220. As will be appreciated by those with ordinary skill in the art, the reduced sound pressure levels indicate that the modal response has been decoupled from excitation at 100 Hz, resulting in a quieter passenger compartment 104 at about 100 Hz.

While at least one exemplary embodiment has been presented in the foregoing detailed description of the invention, it should be appreciated that a vast number of variations exist. It should also be appreciated that the exemplary embodiment or exemplary embodiments are only examples and are not intended to limit the scope, applicability, or configuration of the invention in any way. Rather, the foregoing detailed description will provide those skilled in the art with a convenient road map for implementing an exemplary embodiment of the invention. It is understood that various changes may be made in the function and arrangement of elements described in an exemplary embodiment without departing from the scope of the invention as set forth in the appended claims.

What is claimed is:

1. An aircraft comprising:
    a fuselage;
    a passenger compartment disposed in the fuselage and having a cabin surface that defines a first aperture, wherein an entirety of the passenger compartment defines boundary conditions;
    an air mass having a first acoustic mode defined by the boundary conditions; and
    a first chamber acoustically coupled with the first aperture and having a length that is one quarter of a wavelength of sound at the first acoustic mode.

2. The aircraft of claim 1, further comprising an engine coupled with the fuselage and configured to generate an engine loading that excites the cabin air mass at the first acoustic mode.

3. The aircraft of claim 1, wherein the cabin surface further defines a second aperture, the aircraft further comprising a second chamber acoustically coupled with the second aperture.

4. The aircraft of claim 3, wherein the first aperture and the second aperture are distributed across the cabin surface.

5. The aircraft of claim 3, wherein the second chamber has a length that is one quarter of the wavelength of sound at the first acoustic mode.

6. The aircraft of claim 3, wherein the cabin surface defines a second acoustic mode; and the second chamber has a length that is one quarter of a wavelength of sound at the second acoustic mode.

7. The aircraft of claim 3, wherein first and second apertures are covered with at least one of a plastic, a leather, a fabric, and a composite material.

8. The aircraft of claim 1, wherein the first acoustic mode is below about 500 Hz.

9. The aircraft of claim 8, wherein the first acoustic mode is between about 90 Hz and about 110 Hz.

10. The aircraft of claim 9, wherein the first acoustic mode is at about 100 Hz.

11. The aircraft of claim 1, wherein the cabin surface comprises a closeout panel defining an outer periphery of a passenger compartment of the aircraft.

12. The aircraft of claim 1, wherein the cabin surface comprises at least one of a bulkhead, a piece of aircraft interior furniture, and a credenza.

13. An aircraft comprising:
    a fuselage;
    an engine attached to the fuselage and configured to generate a noise;
    a passenger compartment disposed in the fuselage and having a cabin surface that defines a first aperture acoustically coupled with the passenger compartment, wherein an entirety of the passenger compartment defines boundary conditions;
    an air mass having a first acoustic mode defined by the boundary conditions and excited by the noise; and
    a first chamber acoustically coupled with the first aperture and having a length that is one quarter of a wavelength of sound at the first acoustic mode.

14. The aircraft of claim 13, wherein the cabin surface further defines a second aperture acoustically coupled with the passenger compartment and separated from the first aperture across the cabin surface, the aircraft further comprising a second chamber acoustically coupled with the second aperture.

15. The aircraft of claim 14, wherein the second chamber has a length that is one quarter of the wavelength of sound at the first frequency.

16. The aircraft of claim 14, wherein the engine is further configured to generate the loading at a second frequency and the second chamber has a length that is one quarter of a wavelength of sound at the second frequency.

17. The aircraft of claim 16, wherein the second frequency is between about 200 Hz and about 500 Hz.

18. The aircraft of claim 14, wherein the first aperture is covered with at least one of a foam, a leather, a plastic, a fabric, and a composite material.

19. The aircraft of claim 14, wherein the first frequency is between about 50 Hz and about 150 Hz.

20. The aircraft of claim 19, wherein the first frequency is at about 100 Hz.

* * * * *